Sept. 26, 1933.  E. B. ELTON  1,928,372
MACHINE FOR MOLDING AND COMPRESSING PLASTIC SUBSTANCES
Filed July 16, 1931  3 Sheets-Sheet 1

INVENTOR
Edwin B. Elton,
BY
ATTORNEYS

Sept. 26, 1933.  E. B. ELTON  1,928,372
MACHINE FOR MOLDING AND COMPRESSING PLASTIC SUBSTANCES
Filed July 16, 1931   3 Sheets-Sheet 2

INVENTOR
Edison B. Elton,
BY
ATTORNEYS.

Sept. 26, 1933. E. B. ELTON 1,928,372
MACHINE FOR MOLDING AND COMPRESSING PLASTIC SUBSTANCES
Filed July 16, 1931 3 Sheets-Sheet 3

INVENTOR
Edwin B. Elton,
BY
ATTORNEYS.

Patented Sept. 26, 1933

1,928,372

UNITED STATES PATENT OFFICE 1,928,372

MACHINE FOR MOLDING AND COMPRESSING PLASTIC SUBSTANCES

Edwin Bernard Elton, Hornsea, England

Application July 16, 1931, Serial No. 551,274, and in England July 17, 1930

6 Claims. (Cl. 25—75)

The present invention relates to machines for molding or compressing seed, meal and the like plastic substances.

The object of the present invention is to provide a machine wherein either or both of a pair of interengaging drums have annular compression chambers formed on their periphery, one or more of said chambers having apertures in one face through which the material is forced on compression thereof.

Another object of the present invention is to provide a machine which includes a pair of drums having complementary annuli on their interengaging peripheries, certain of said annuli of one drum terminating in apertures through which the material is forced by the complementary annuli of the other drum.

In a particular form of construction according to the present invention the pair of drums each have a plurality of annular grooves formed on their periphery by the provision of spaced annular flanges thereon, the drums being adapted to interengage with the flanges of one drum engaging within the grooves on the other so that seed, meal and the like plastic substances may be compressed within the annular grooves and forced through apertures extending from the base of said grooves through the walls of the drums.

After passing through the apertures the compressed meal is adapted to be cut off in lengths by means of a knife.

The apertures preferably are reduced in size in a direction from the inlet towards the outlet thereof to form a restricted outlet, that is to say, the material is impeded in its passage through the apertures to cause a compression of the material to the particular cross section required. The drums may be mounted on spindles in any suitable frame and may be driven by means of gear wheels or other suitable means.

The invention is more particularly described with reference to the accompanying drawings which illustrate one form of construction only, by way of example, and in which:—

Figure 1:
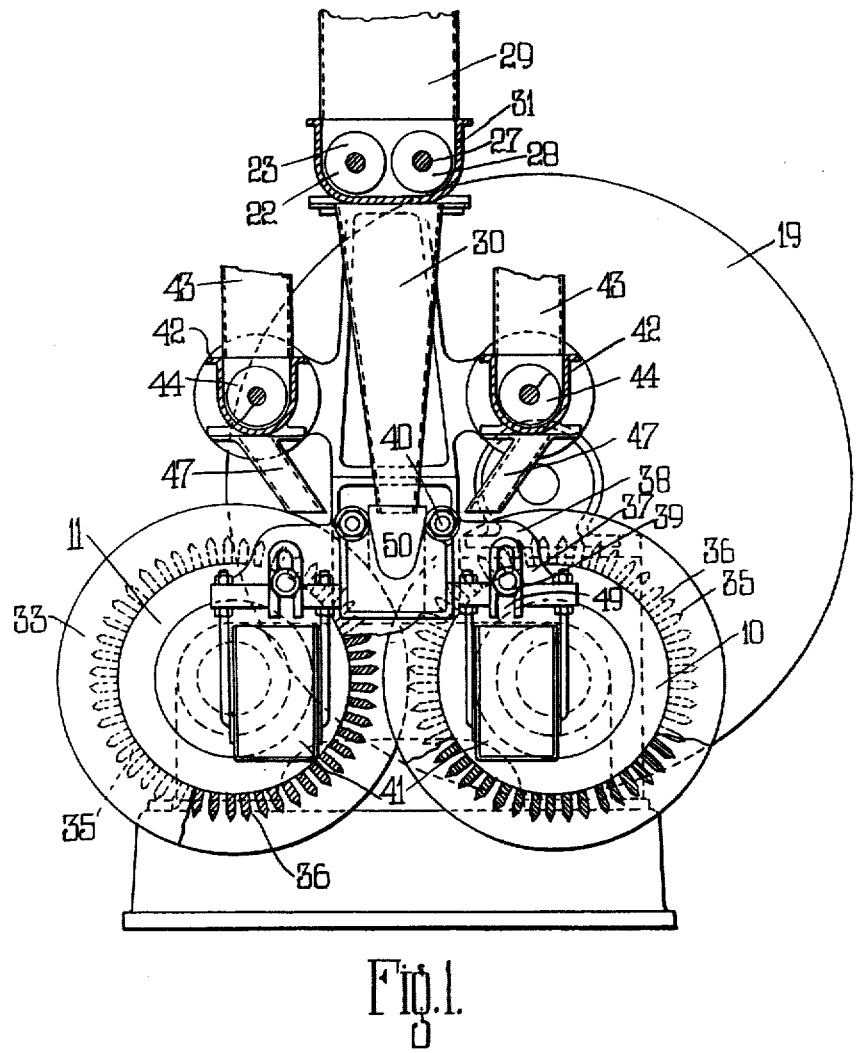
Figure 1 is a view in elevation of a machine, with the drums shown partly in section.
Figure 2:
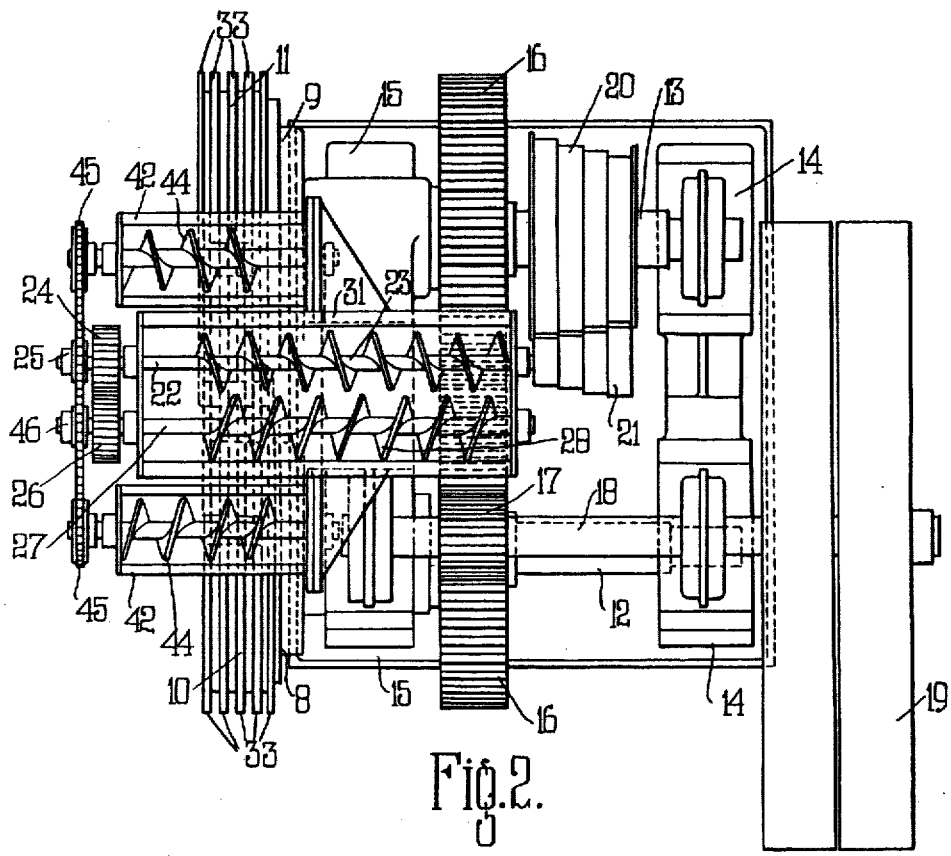
Figure 2 is a corresponding plan view with the cutting devices for the meal removed.
Figure 3:
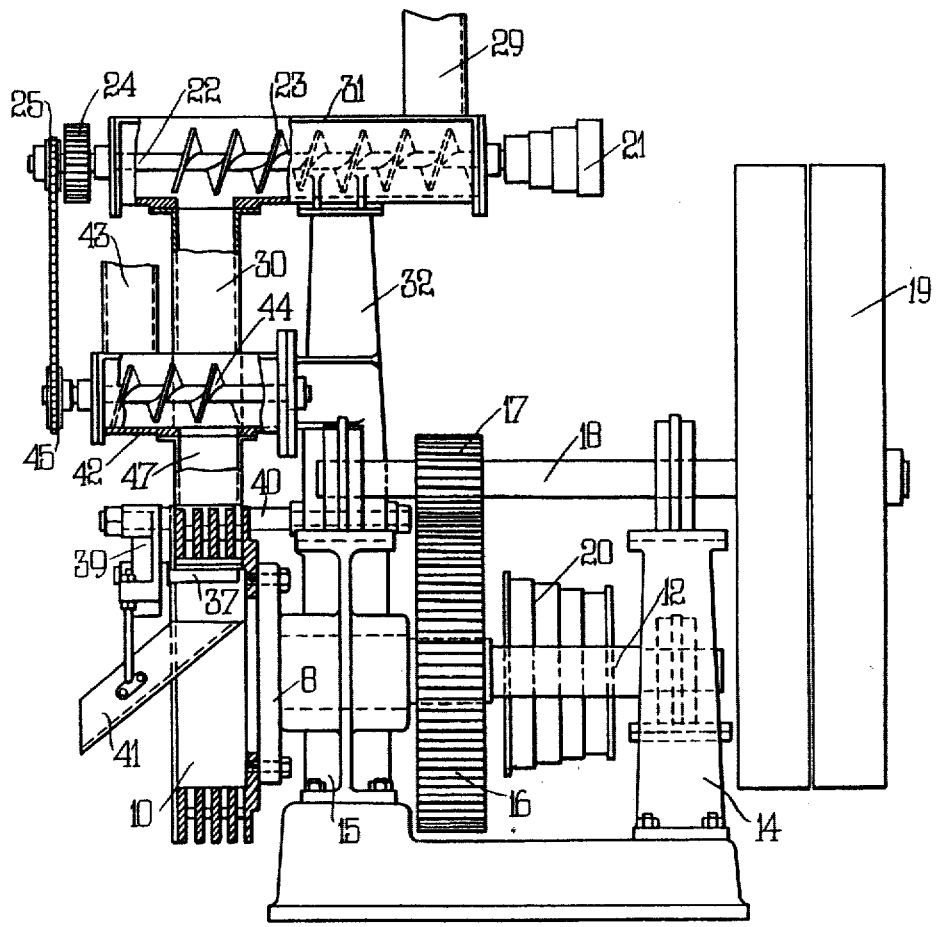
Figure 3 is a corresponding side elevation showing one drum in section.

In the construction according to the drawings a pair of hollow drums 10, 11 are detachably secured to flanges 8, 9, such as for example by means of bolts, which flanges are mounted respectively on the ends of, and for rotation with, shafts 12, 13 which are rotatable in bearings formed in standards 14, 15. The shafts 12, 13 are rotated by gear wheels 16 driven from a gear wheel 17 on a shaft 18 provided with a driving pulley 19.

The shaft 13 carries cone pulleys 20 which are connected by an endless belt (not shown) to cone pulleys 21 on a shaft 22. This shaft 22 carries a worm conveyor 23, a gear wheel 24 and a chain wheel 25. The gear wheel 24 of the shaft 22 meshes with a gear wheel 26 on a shaft 27 carrying a second worm conveyor 28. The worm conveyors 23 and 28 are situated in the same chamber 31 and in effect form a double worm conveyor to which the material to be compressed is passed from an inlet 29 and from which such material is exhausted down a chute 30 to a position between the two drums 10 and 11. The chamber 31 is supported on a bracket 32 mounted on the standard 15.

Figure 4:
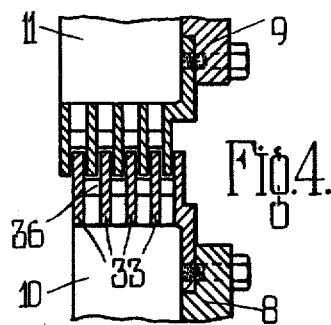
Figure 4 is a detail illustrating the manner of inter-engagement of the flanges of the drums.

Each of the drums 10 and 11 have spaced annuli preferably in the form of flanges 33 provided on their outer peripheries so that when the drums rotate the flanges 33 on one drum engage within grooves on the other drum, that is to say the flanges of one drum overlap the flanges of the other. This is particularly illustrated in the cross sectional detail shown in Fig. 4. At the base of each of the grooves between the flanges provided on the periphery of the drums, apertures 35 are formed, these apertures being of greater width at their outer or inlet end than at the inner or exit end.

In the particular form of construction shown in the drawings, the flanges taper over a portion of their length only as shown at 36, and then over the remaining portion are substantially consistent as regards width, so that meal compressed by an annular flange 33 of one drum in an annular groove formed between two adjacent flanges 33 of the other drum is forced along the tapered portions 36 of the apertures and thence along the remaining portion of the apertures to a position internally of the drum where the meal so extruded is cut off in lengths by knives 37. These knives 37 are adjustably fixed to brackets 38 by means of pins or bolts 39 engaging within slots 49 of such brackets. The brackets 38 are supported by rods 40 connected to the frame 15 of the machine.

Trays 41 are provided for collecting the material which has been cut up into lengths by the knives 37, such trays preferably extending out of the limiting vertical plane of the drums.

Where it is desired to add a binding, cooling or finishing medium to the material to be compressed, such binding, cooling or finishing medium is fed into a pair of chambers 42 from chutes 43.

Worm conveyors 44 are provided in the chambers 42, such worm conveyors being driven from a pair of chain wheels 45 which in turn are driven respectively from the chain wheel 25 on the shaft 22 and a chain wheel 46 on the shaft 27. As a result of the rotation of the worm conveyors 44, the binding, cooling or finishing medium is fed down chutes 47 to enter the annular grooves in the drums 10 and 11 before such grooves receive the main feed from the chute 30.

This is of particular advantage when wet or sticky materials are to be compressed as in such event a drying or finishing medium may be passed down the chutes 47 to form a lining for the grooves before such grooves receive the wet or sticky material. As a result, such drying or finishing medium forms the outer layer or coating of the finished product and enables the collection and storage of such finished product to be satisfactorily carried out without the possibility of adhesion of the various pieces one with another.

Similarly, when molding dry material a binding medium may be introduced into the chambers 42 in exactly the same manner.

In operation, the material to be compressed or molded is fed down the chute 29 to be taken up by the double worm conveyors in the chamber 31 and forced down the chute 30 past the exit nozzle 50 which is situated above the bight of the drums. The material is thus caused to pass into the annular grooves between the annular flanges 33 on the drums with the result that the flanges of each drum cause compression of the material within the compression chambers formed by the annular grooves of the other drum and whilst such compression is taking place the flanges themselves form the axial boundaries of any one groove of that drum, thereby preventing axial displacement of the meal when it is compressed in said groove by the corresponding flange of the other drum.

The flanges 33 forming the boundary walls of each annular chamber confine the spaces within which the pressure is effected with the result that the meal is carried forward to attain maximum pressure when it reaches the horizontal plane containing the axes of rotation of the drums.

The compression in each annular groove is complete irrespective of what occurs in the other grooves, with the result that each drum, in effect, consists of a number of smaller drums of lesser axial length.

It will be appreciated that in the construction illustrated in the drawings, by virtue of the fact that the drums 10 and 11 respectively are detachably mounted on flanges situated actually at the ends of the shafts 12 and 13, rapid and easy interchange of parts is possible without dismantling the plant should it be desired to vary the cross section of the finished product.

The invention is not limited to the particular form of construction illustrated in the drawings, as various modifications may be devised without departing from the scope of the invention. For example, instead of making both drums hollow, one of the drums may be solid, but still have flanges provided on its outer periphery to compress meal and the like substance between corresponding flanges on the other drum and through apertures formed at the base of the annular grooves between such flanges on said other drum.

Again, if desired, both drums may be hollow and one rotated within the other, in which case the outer periphery of the inner or smaller drum is provided with annular grooves separated by flanges which engage within annular grooves on the inner periphery of the larger drum.

Further, as a modified form of such latter construction, the inner drum may be solid so that meal is compressed within the decreasing space between the inner and outer drums and pass outwardly through apertures in the outer drum only to be cut off by knives situated externally of the outer drum.

I declare that what I claim is:—

1. A machine for molding plastic substances comprising a pair of rotatable drums interengaging at their outer peripheries, means to rotate said drums about parallel axes, spaced annular flanges formed on the peripheries of said drums forming annular grooves on each drum within which are engaged the flanges of the other drum, the base of said grooves communicating with apertures through the corresponding drum for the forcing therethrough of plastic substances by the flanges of said other drum.

2. A machine for molding plastic substances comprising a pair of hollow drums in outer peripheral contact, means for driving said hollow drums about parallel axes and complementary annuli on the peripheries of said drums, said drums having apertures therein communicating with the spaces between said annuli, through which plastic material is forced by the complementary annuli of the other drum and interengagement and rotation of both hollow drums.

3. A machine for molding plastic substances including a pair of rotatable drums having circumferential annuli on their inter-engaging peripheries with the annuli of one drum complementary to the annuli of the other drum, certain of said annuli of one drum having at their base a single series of circumferentially spaced apertures through which the material is forced by the inter-engaging and complementary annuli of the other drum.

4. A machine for molding plastic substances comprising a pair of drums contacting peripherally, means for rotating said drums about parallel axes and spaced annuli on the periphery of each drum with the annuli of one drum complementary to the annuli of the other drum, certain of said annuli having a single series of circumferentially spaced apertures at their base, through which the plastic substances are forced by the complementary annuli of the other drum on inter-engagement and rotation of the annuli on both drums.

5. A machine for molding plastic substances comprising a rotatable drum, a second rotatable drum in peripheral engagement with said first drum, means for rotating said drums about parallel axes, at least two annular compression chambers formed on the periphery of each of said drums, chambers of at least one drum having a single series of circumferentially spaced apertures formed in their base for the compression and passage therethrough of plastic substances during inter-engagement and rotation of said drums.

6. A machine for molding plastic substances comprising a pair of rotatable peripherally interengaging drums one of which has hollow means to rotate said drums about parallel axes, spaced annular flanges formed on the peripheries of said drums forming annular grooves thereon with the flanges of one drum engaging in the groove of the other drum, the base of each peripheral groove of the hollow drum having a single series of circumferentially spaced apertures therein for the forcing therethrough of the plastic substances by the flanges of the other drum.

EDWIN BERNARD ELTON.